United States Patent Office 3,489,580
Patented Jan. 13, 1970

3,489,580
REFRACTORY BRICK
David J. Nell, West Mifflin, and Ben Davies, Pittsburgh, Pa., assignors to Dresser Industries, Inc., Dallas, Tex., a corporation of Delaware
No Drawing. Filed May 16, 1967, Ser. No. 638,744
Int. Cl. C04b 35/42
U.S. Cl. 106—59        2 Claims

ABSTRACT OF THE DISCLOSURE

Burned magnesite-chrome ore brick having a microstructure characterized by substantial direct attachment of magnesia and chrome ore grain and a portion of the interstices between said magnesia and chrome ore grain filled with hydrates of magnesia and magnesium sulfates.

Background

Refractory brick are classified chemically as being basic or acid. Basic brick are those which have chemical resistance to basic slags at elevated temperatures; whereas, acid brick are those which have chemical resistance to acid slags at elevated temperatures. Basic brick are made primarily from dead burned magnesite, dolomite, and chrome ore. Commercially available dead burned magnesites and chrome ores contain up to about 5% silica ($SiO_2$). Conventional burned basic brick are bonded by a "glue" of silicate minerals which fill the interstices between dead burned magnesia grains and chrome ore grains. Because silicate minerals form lower melting eutectics than magnesite and magnesite-chrome ore minerals, the refractoriness of conventional burned basic brick is determined by the character and amount of the silicate minerals present.

Recently there has been developed "direct-bonded magnesite-chrome ore brick" in which the microstructure is characterized by substantial direct attachment of magnesia and chrome ore grains without intervening silicate films. Techniques for making direct bonded magnesite-chrome ore brick are described in U.S. Patents 3,180,743, 3,180,744, and 3,180,745. These refractories, when studied under a microscope at room temperature, exhibit a peculiar combination of bonding and tessellated cracking between the chrome ore and magnesite. In some manner this tessellated cracking appears to overcome or compensate for internal stresses which occur in shapes at operating temperatures; while the bonding forms a rigid skeletal network in the refractory that provides good strength at elevated temperatures. This peculiar combination of tessellated cracking and bonding results in shapes having strengths at 2300° F., which exceeds twice that at room temperature. Hence, while direct bonded brick have excellent high-temperature strength which has been the basis of their exciting commercial success, they have been somewhat unsatisfactory where room-temperature strength is required; for example, when metal-encasing, packing, shipping, and installing.

It is an object of this invention to provide a direct bonded magnesite-chrome ore brick with all the desirable high-temperature properties and with increased room-temperature strength.

It is another object of this invention to provide a method for rendering direct bonding magnesite-chrome ore brick stronger at room temperature without affecting the high-temperature properties that characterize direct bonded brick.

Brief description

Briefly, direct bonded magnesite-chrome ore brick (for example, made according to the teachings of the U.S. patents referred to above) are impregnated with a 5% to saturated solution of Epsom salts, either by dipping or by spraying. The bricks are thereafter dried at about 250° F. Impregnating with Epsom salts fills a portion of the interstices between the magnesia and the chrome ore grains with hydrates of magnesia and magnesium sulfate. Preferably, at least 70%, by volume, of the interstices (measured as porosity) are impregnated with Epsom salts solution.

Detailed description

A size graded batch of Philippine chrome ore concentrates and dead burned magnesite was prepared as given in Table I below. It was tempered with the percentage of binders given in Table I and pressed into brick at about 8000 to 10,000 p.s.i. The brick were dried overnight at about 250° F. and, thereafter, burned to develop the direct bond. After burning, the brick had the physical properties indicated in Table I.

TABLE I

Batch [1]:
Philippine chrome ore concentrates __percent__ 30
Dead burned magnesite _____ 70
Binders and tempering water added __percent__ 4.5
Bulk density, pcf [2] _____ 187
Modulus of rupture, p.s.i:
At room temperature [3] _____ 390

[1] Sizing according to U.S. Patent No. 3,180,744.
[2] ASTM Method C134–41, Manual of ASTM Standards on Refractory Materials. 9th edition, page 154.
[3] ASTM Method C133–55, ibid, page 145.

Brick described in Table I were then impregnated with Epsom salts solution as described in Table II. After the impregnation the brick were dried for about 10 hours at 250° F. The modulus of rupture after impregnating is given in Table II.

TABLE II

| Example | A | B | C | D | E | F | G |
|---|---|---|---|---|---|---|---|
| Impregnating solution | | 40 parts epsom salts, 60 parts water | | | | | |
| Time immersed (seconds) | 10 | 20 | 30 | 40 | | | |
| Time sprayed (seconds) | | | | | 30 | 40 | 60 |
| Weight increase after drying (percent) | 0.5 | 0.6 | 0.7 | 0.7 | 0.3 | 0.4 | 0.5 |
| Modulus of rupture, p.s.i. | 880 | 1,280 | 1,290 | 1,360 | 910 | 900 | 1,000 |

Table II establishes that by impregnating with Epsom salts solution, either by spraying or dipping, the room-temperature strength of direct bonded brick can be substantially increased such that the brick are not chipped and cracked during metal-encasing, handling, and installing. Example D is the best mode now known for the practice of this invention.

While the room-temperature strength of brick made according to this invention is improved, the high-temperature strength is not affected detrimentally. Epsom salts, whose chemical formula is usually given as $MgSO_4 \cdot 7H_2O$, is as far as applicants know the only impregnant that will increase room-temperature strength without detrimentally affecting high-temperature strength or providing the brick with some other undesirable property. Silicates and phosphates will form intervening silicate or phosphate films, destroying the direct bonding. Sodium salts will increase the tendency of basic brick to hydrate in the presence of moisture. Magnesium chloride is volatile at elevated temperatures. Organic binders such as ligno-sulfonate liquor have the disadvantage of tending to burn out at relatively low temperatures.

A typical chemical analysis of the raw materials used in the exemplary brick, reported as oxides in accordance with the common practice in the refractories industry, is as follows:

TABLE III

| | Philippine chrome ore concentrates, percent | Dead burned magnesite, percent |
|---|---|---|
| Silica ($SiO_2$) | 2.6 | 0.7 |
| Alumina ($Al_2O_3$) | 29.5 | 0.5 |
| Iron Oxide ($Fe_2O_3$) | 14.0 | |
| Chromic Oxide ($Cr_2O_3$) | 34.8 | |
| Lime (CaO) | 0.5 | 0.8 |
| Magnesia (MgO) | 17.2 | 98.0 |
| Loss on ignition | 0.9 | |

Having thus described the invention in detail and with sufficient particularity as to enable those skilled in the art to practice it, what is desired to have protected by Letters Patent is set forth in the following claims.

We claim:
1. Burned magnesite-chrome ore brick having a microstructure characterized by substantial direct attachment of magnesia and chrome ore grain and interstices between said grains, at least 70%, by volume, of the interstices being impregnated with hydrates of magnesia and magnesium sulfates.

2. Method of improving the room-temperature strength of burned magnesite-chrome ore brick having a microstructure characterized by substantial direct attachment of magnesia and chrome ore grain comprising the steps of:
   (1) impregnating at least 70% of the interstices of the brick with a 5% to saturated solution of Epsom salts; and
   (2) drying the brick at about 250° F.

References Cited

UNITED STATES PATENTS

| 2,265,682 | 12/1941 | Bennett et al. | 106—66 |
| 2,947,649 | 8/1960 | Davies | 106—59 |
| 3,180,743 | 4/1965 | Davies et al. | 106—59 |
| 3,180,744 | 4/1965 | Davies et al. | 106—59 |
| 3,180,745 | 4/1965 | Davies | 106—59 |

JAMES E. POER, Primary Examiner